(12) United States Patent
van Klooster et al.

(10) Patent No.: US 9,489,936 B2
(45) Date of Patent: Nov. 8, 2016

(54) ULTRASONIC TRANSDUCER

(71) Applicant: Krohne AG, Basel (CH)

(72) Inventors: Jeroen Martin van Klooster, Tiel (NL); Arie Huijzer, Sliedrecht (NL)

(73) Assignee: Krohne AG, Basel (CH)

( * ) Notice: Subject to any disclaimer, the term of this patent is extended or adjusted under 35 U.S.C. 154(b) by 363 days.

(21) Appl. No.: 14/165,999

(22) Filed: Jan. 28, 2014

(65) Prior Publication Data

US 2014/0217854 A1 Aug. 7, 2014

(30) Foreign Application Priority Data

Jan. 28, 2013 (DE) .................. 10 2013 001 351

(51) Int. Cl.
| | |
|---|---|
| *H01L 41/09* | (2006.01) |
| *H01L 41/113* | (2006.01) |
| *H01L 41/053* | (2006.01) |
| *G10K 11/00* | (2006.01) |
| *G01F 1/66* | (2006.01) |
| *G01F 15/18* | (2006.01) |

(52) U.S. Cl.
CPC ............. *G10K 11/004* (2013.01); *G01F 1/662* (2013.01); *G01F 15/18* (2013.01); *G10K 11/002* (2013.01)

(58) Field of Classification Search
CPC ......... B06B 3/00; B06B 3/02; B23K 20/106; B29C 65/08; G01F 1/622; G01F 15/18
USPC .................................................. 310/311–371
See application file for complete search history.

(56) References Cited

U.S. PATENT DOCUMENTS

| | | | | |
|---|---|---|---|---|
| 4,486,680 | A * | 12/1984 | Bonnet ............. | A61B 17/22012 310/323.19 |
| 4,537,511 | A * | 8/1985 | Frei ........................... | B06B 3/00 134/1 |
| 5,159,838 | A | 11/1992 | Lynnworth | |
| 5,275,060 | A | 1/1994 | Lynnworth | |
| 6,652,992 | B1* | 11/2003 | Gunnerman ............. | B06B 3/00 181/142 |
| 6,799,475 | B2 | 10/2004 | Van Klooster | |
| 7,439,654 | B2* | 10/2008 | McDermott ............. | B08B 3/12 310/323.19 |
| 7,973,453 | B2 | 7/2011 | van Klooster | |
| 2002/0104384 | A1* | 8/2002 | Bekkum .................. | G01F 1/667 73/861.23 |
| 2002/0143252 | A1* | 10/2002 | Dunne ...................... | B06B 1/04 600/437 |
| 2004/0084995 | A1* | 5/2004 | Stegelmann ............. | B06B 3/00 310/323.19 |

(Continued)

FOREIGN PATENT DOCUMENTS

| | | | | |
|---|---|---|---|---|
| CA | 2672058 | * | 7/2009 | ............... H04R 1/02 |
| DE | 19812458 A1 | * | 3/1998 | ............... G01F 1/66 |

(Continued)

*Primary Examiner* — Thomas Dougherty
(74) *Attorney, Agent, or Firm* — David S. Safran

(57) ABSTRACT

An ultrasonic transducer as an important part of an ultrasonic flow meter is described, with a transducer housing and with a transducer element, the transducer housing having an ultrasound window and a housing tube, the transducer element being made for sending or receiving ultrasonic waves and being either near the ultrasound window of the transducer housing or away from the ultrasound window of the transducer housing, there being a relatively soft mechanical coupling system and the mechanical coupling system having preferably at least one weakly coupled mechanical resonator. The ultrasonic transducer is improved with respect to the prevention of the transmission of housing waves by there being a second soft mechanical coupling system.

16 Claims, 3 Drawing Sheets

(56) References Cited

U.S. PATENT DOCUMENTS

| | | | |
|---|---|---|---|
| 2007/0257579 A1* | 11/2007 | Liu | B06B 3/00 310/323.19 |
| 2010/0011866 A1* | 1/2010 | Van Klooster | G10K 9/22 73/644 |
| 2012/0125122 A1 | 5/2012 | Gottlieb et al. | |
| 2012/0153777 A1* | 6/2012 | Ueberschlag | G01F 1/662 310/336 |
| 2013/0298675 A1* | 11/2013 | Thiruvenkatanathan | G01C 19/5726 73/504.16 |
| 2014/0208866 A1* | 7/2014 | Van Klooster | G01F 1/662 73/861.18 |
| 2015/0114134 A1* | 4/2015 | Van Klooster | G01F 1/66 73/861.24 |

FOREIGN PATENT DOCUMENTS

| | | | | |
|---|---|---|---|---|
| DE | 198 12 458 A1 | 10/1999 | | |
| DE | 102010064117 A1 | 6/2012 | | |
| DE | 102011082615 A1 * | 3/2013 | | G01F 1/66 |
| EP | 1 046 886 A1 | 10/2000 | | |
| GB | 2364122 B | 7/2003 | | |

* cited by examiner

ULTRASONIC TRANSDUCER

BACKGROUND OF THE INVENTION

1. Field of the Invention

The invention relates to an ultrasonic transducer as an important part of an ultrasonic flow meter, with a transducer housing and with a transducer element, the transducer housing having an ultrasound window and a housing tube, the transducer element being made for sending or receiving ultrasonic waves and being either near the ultrasound window of the transducer housing or away from the ultrasound window of the transducer housing, and there being a relatively soft mechanical coupling system. Here, the transducer housing can have the ultrasound window in a first region. Conventionally, the ultrasonic waves can be transmitted as housing waves between the first region of the transducer housing via a relaying second region of the transducer housing into a third region of the transducer housing which is opposite the first region of the first transducer housing. The relatively soft mechanical coupling system can be provided in the second region of the transducer housing and can have at least one weakly coupled mechanical resonator, preferably can have two weakly coupled mechanical resonators.

2. Description of Related Art

Measurement, control and automation engineering are of special importance in industry. This applies especially to measurement engineering which is the basis for control and automation engineering. One important area of measurement engineering is flow rate measurement engineering (compare the comprehensive treatment of Pr. Dr. sc. nat. Otto Fiedler "Flow and Flow Rate Measurement Engineering", R. Oldenbourg Verlag Munich 101992). Flow rate measurement according to mechanical action principles, especially variable-area flow meters and Coriolis flow meters, thermal flow meters, magnetic-inductive flow meters and ultrasonic flow meters are of special importance for flow rate measurement engineering (see, "Flow and Flow Rate Measurement Engineering" op. cit.).

In ultrasonic flow meters, the effect is used that, in a medium transported in a measurement tube, the transport velocity of the medium is superimposed on the propagation velocity of the acoustic signal. The measured propagation velocity of the acoustic signal relative to the measurement tube is therefore greater than in a quiescent medium when the medium is being transported in the direction of the acoustic signal, and the velocity of the acoustic signal relative to the measurement tube is smaller than in the quiescent medium when the medium is being transported opposite the direction of the acoustic signal. The propagation time of the acoustic signal between the acoustic sender and the acoustic receiver (acoustic senders and acoustic receivers are ultrasonic transducers) based on the entrainment effect is dependent on the transport velocity of the medium relative to the measurement tube and thus relative to the ultrasonic transducer, therefore relative to the acoustic sender and the acoustic receiver.

The problem in ultrasonic flow meters is that the ultrasonic waves generated in the ultrasonic transducer or the ultrasonic waves received by the ultrasonic transducer are transmitted not only from the sending and/or receiving side of the transducer housing into the surrounding medium of the ultrasonic transducer, that the transmitted or received ultrasonic waves are also transmitted via the transducer housing, optionally also via a housing holder. This is problematic not only because, under certain circumstances, a major part of the transmitted power or received power is thus lost, but rather it is mainly problematic because the ultrasonic waves transmitted to the transducer housing by so-called crosstalk can also lead to considerable reception-side interference. This is due to the fact that, for example, it cannot be distinguished on the reception side whether the received ultrasonic waves have been received via the medium—useful signal—or via the transducer housing.

In particular, in the use of ultrasonic flow meters for measuring the flow rate of gaseous media, the portion of the oscillation energy which has been transmitted from the ultrasonic transducer into the gaseous medium is very small as compared to the oscillation energy generated altogether, so that the problem of crosstalk is especially serious here.

In the prior art, various measures are known for reducing the above explained crosstalk, therefore the formation of housing waves. Some measures relate to the task of preventing the formation of these housing waves. They include, for example, certain configurations of the ultrasound window of the transducer housing with respect to especially good impedance matching for maximizing the transmitted energy portion or with respect to a design of an ultrasound window as a $\lambda/4$ layer to reduce reflections. Other measures relate to preventing housing waves which have already formed from being relayed, for example, by mismatched acoustic impedance transitions.

The initially described the prior art ultrasonic transducer underlying the invention is described in German Patent Application 10 2008 033 098 and European patent disclosure document 2 148 322 which correspond to U.S. Pat. No. 7,973,453 B2. In these ultrasonic transducers, another measure for preventing the transmission of housing waves to the transducer housing of the ultrasonic transducer is implemented by there being a relatively soft mechanical coupling system in the second region of the transducer housing and by the coupling system having at least two weakly coupled mechanical resonators which are active in the propagation direction of the housing waves essentially in succession.

First of all, the mechanical resonators make it possible to locally "catch" the energy which has been transported by the ultrasonic waves, specifically by excitation of the mechanical resonators to oscillations. Mechanical resonators can be conventionally described as spring-mass systems, and for real spring-mass systems the property of the spring, specifically a deflection-dependent force action, cannot be implemented without contributing an amount, even if very small, to the mass of the resonator, exactly like a mass due to its mechanical incorporation into the resonator always influences the spring property of the spring-mass system; the spring and mass cannot be completely separated from one another structurally.

The serial arrangement of at least two mechanical resonators in the propagation direction of the housing waves results in that the housing waves must traverse all resonators in order to travel from the first region of the transducer housing to the third region of the transducer housing and vice versa. The weak coupling of the two resonators results in that the resonators altogether constitute a greater barrier to the housing waves than is the case for strongly coupled resonators, even if they inherently have otherwise the same oscillation properties. For strong mechanical coupling, the oscillation of one resonator is transmitted essentially directly to the adjacent resonator; this is not the case for weak mechanical coupling even if there is also a mechanical interaction between the adjacent resonators.

The above described coupling system which is formed of at least two weakly coupled mechanical resonators is also called a "relatively soft mechanical coupling system", and with respect to possible implementations reference is made to the disclosure contents of German patent disclosure document 10 2008 033 098 and the parallel European patent disclosure document 2 148 322 which correspond to U.S. Pat. No. 7,973,453 B2 which are hereby incorporated by reference.

SUMMARY OF THE INVENTION

The primary object of the present invention is to improve the ultrasonic transducer underlying the invention with respect to improving the prevention of the transmission of housing waves.

According to a first teaching in accordance with the invention, an ultrasonic transducer which has been improved with reference to the prevention of the transmission of housing waves has a second soft mechanical coupling system. Here, the second coupling system can be implemented essentially corresponding to the first coupling system. At this point, reference is made again to the disclosure contents of German patent disclosure document 10 2008 033 098 and the parallel European patent disclosure document 2 148 322 which correspond to U.S. Pat. No. 7,973,453 B2.

While in the first coupling system, and preferably also in the second coupling system, there is at least one weakly coupled mechanical resonator, preferably in the first coupling system and/or in the second coupling system, there are at least two weakly coupled resonators which are active essentially in succession in the propagation direction of the housing waves, and the resonators therefore act in series, another teaching of the invention which acquires special importance, if there is a second coupling system, is to implement the formation and arrangement of the two coupling systems such that they are active in parallel.

In the ultrasonic transducer underlying the invention, the transducer element is on the lower end of the transducer housing, i.e., on the end facing the flowing medium or which even projects into the flowing medium. The mechanical coupling system is implemented more or less on the upper end of the transducer housing, and in a certain manner, is also part of the transducer housing. The region of the transducer housing in which there is the transducer element was called the first region of the transducer housing above, the upper region was called the third region and the region which lies between the first region and the third region was called the second region, specifically a relaying second region of the transducer housing via which the housing waves propagate in the direction of the third region of the transducer housing. The known ultrasonic transducer underlying the invention can also be described such that it is made in three parts, specifically has a lower first region which holds the transducer element, a relaying second region and an upper third region to which the coupling system belongs. For example, the lower first region, the relaying second region and the upper third region are each connected to one another by welding. The relaying second region can be a housing tube and the upper end of the transducer housing can be made as a housing flange. The lower first region of the transducer housing, the relaying second region of the transducer housing which is made as a housing tube, the coupling system and the housing flange are located in series.

With consideration of what was stated above with respect to the known ultrasonic transducer underlying the invention, another teaching of the invention which, in turn, acquires special importance becomes in particular understandable. Accordingly, the ultrasonic transducer in accordance with the invention, in addition, is wherein one of the two coupling systems is located on the side of the housing flange near the transducer element and the other of the coupling systems is located on the side of the housing flange away from the transducer element. This can be done, in particular, such that the coupling system located on the side of the transducer housing near the transducer element is connected to the housing tube on its end near the transducer element and is connected to the housing flange on its end away from the transducer element, and that the coupling system provided on the side of the housing flange away from the transducer element is connected on its end away from the transducer element to the housing tube and on its end near the transducer element to the housing flange. In this especially advantageous configuration of the ultrasonic transducer in accordance with the invention, therefore, the two coupling systems are active anti-parallel. Housing waves emerging from the transducer element in the coupling system near the transducer element, on the one hand, and in the coupling system away from the transducer element, on the other hand, have a partially, preferably completely compensating action with respect to the housing flange.

It was described above how the coupling systems are preferably connected to the housing tube and the housing flange. This connectedness can, of course, be implemented differently. Preferably, the end of the coupling system which is near the transducer element, and the end of the coupling system which is away from the transducer element, are welded to the housing tube. Here, but not exclusively here, an embodiment is recommended in which the end of the coupling system which is near the transducer element, and which end is away from the transducer element, and the end of the coupling system which is away from the transducer element, and which end is near the transducer element, are made integral with the housing flange.

In the known ultrasonic transducer underlying the invention and in the ultrasonic transducer in accordance with the invention which has been described so far, the transducer element is located on or in the end of the transducer housing facing the medium.

Often, in ultrasonic transducers the transducer elements are piezoelements which cannot be used above a certain temperature, i.e., the Curie point. Taking this into account, in the prior art, there are also ultrasonic transducers in which the transducer elements are on the end away from the medium, and the generated ultrasound is supplied via an acoustic funnel and a funnel jacket to the ultrasound window (see German patent 198 12 458 and corresponding European patent 1 046 886 in this respect). In particular, in these ultrasonic transducers, but not only in these ultrasonic transducers, it is otherwise recommended that the coupling system or coupling systems be provided with a groove which runs around the outside or with grooves which run around the outside, therefore, so to speak, an elastic hinge can be implemented between one mechanical resonator and the other mechanical resonator. Here, it is recommended that the grooves be made arc-shaped in the groove base or provided with arc-shaped transitions to the groove flanks, as a result of which partial mechanical overstresses can be avoided.

According to another teaching in accordance with the invention which is important with what was described above, but is also important separate from it, an ultrasonic transducer in accordance with the invention is wherein there is damping material within the transducer housing, especially bronze granulate or bronze powder. So that this damping material cannot penetrate into the ultrasound window which must, of course, remain free, it is also provided that the transducer housing has an insulating disc on its end near the ultrasound window which prevents penetration of the damping material into the ultrasound window.

If the ultrasonic transducer is one as is known from German patent 198 12 458 and corresponding European patent 1 046 886, in which the transducer element is on the end away from the ultrasound window of the transducer housing and there is an ultrasound waveguide between the transducer element and the ultrasound window, it is recommended that there be a protective tube which surrounds the ultrasound waveguide. The damping material which is provided within the transducer housing is designed to damp only housing waves, and of course, not to adversely affect the transmission properties of the ultrasound waveguide.

The damping material which is provided within the transducer housing in the embodiment of an ultrasonic transducer in accordance with the invention which was described last acts well when and only when it is under a certain pressure within the transducer housing. Consequently, it is recommended that there be a pressure generating apparatus which acts on the damping material on the end of the transducer housing away from the ultrasound window. This pressure generating apparatus preferably has a spring which is supported on one side on the transducer housing and which acts on the damping material on the other side and, especially a cup spring assembly.

In particular, there are various possibilities at this point for configuring and developing the ultrasonic transducer in accordance with the invention. In this regard reference is made to the following exemplary embodiments which are described below in conjunction with the accompanying drawings.

DETAILED DESCRIPTION OF THE INVENTION

The ultrasonic transducers in accordance with the invention shown in the figures are each an important part of an ultrasonic flow meter which is otherwise not shown. The ultrasonic transducers have, first of all, a transducer housing 1 and a transducer element 2 which is preferably a piezo-element. The transducer element 2 is made for sending or receiving ultrasonic waves.

Figure 1:
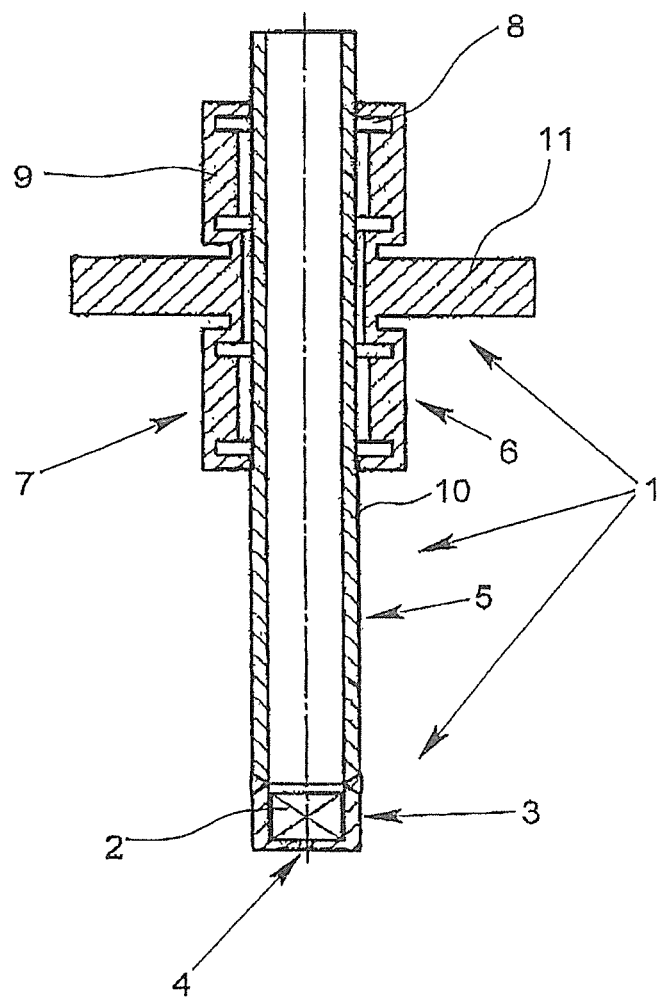
FIG. 1 is a sectional view of a first exemplary embodiment of an ultrasonic transducer in accordance with the invention.
Figure 2:
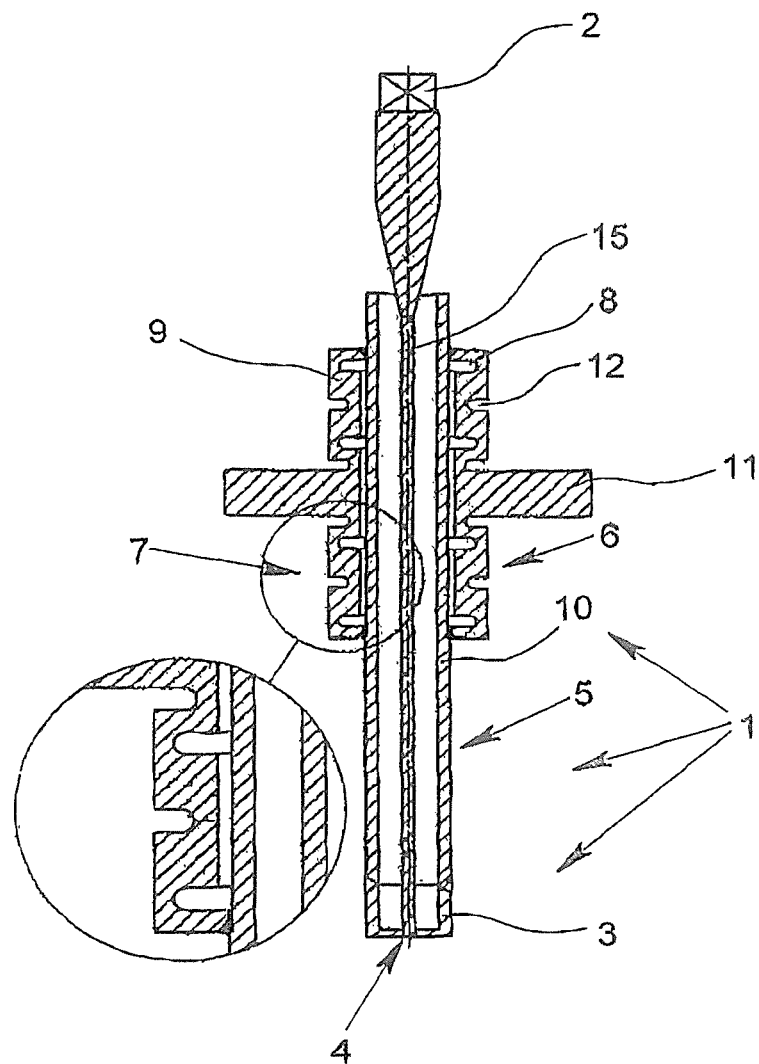
FIG. 2 is a sectional view of a second exemplary embodiment of an ultrasonic transducer in accordance with the invention with an enlarged detail broken out and FIG. 3 is a sectional view of a third exemplary embodiment of an ultrasonic transducer in accordance with the invention.
Figure 3:
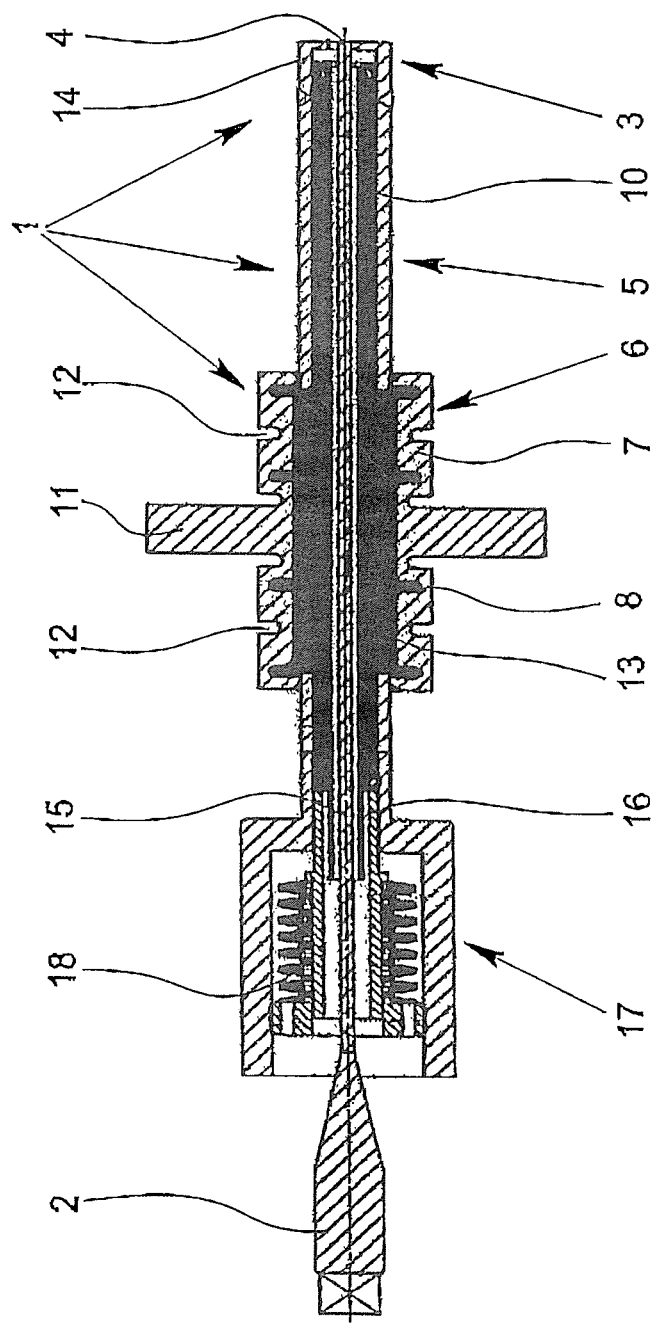

As is shown in FIGS. 1 to 3, the transducer housing 1 has an ultrasound window 4 in a first region 3. In the exemplary embodiment as shown in FIG. 1, the transducer element 2 is near the ultrasound window 4 of the transducer housing 1. In contrast, in the exemplary embodiments as shown in FIGS. 2 and 3 the transducer element 2 is located outside the transducer housing 1.

Undesirably, but inevitably, ultrasonic waves are transmitted as housing waves between the first region 3 of the transducer housing 1 via a relaying second region 5 of the transducer housing 1 into a third region 6 of the transducer housing 1 which is opposite the first region 3 of the transducer housing 1. There is a relatively soft mechanical coupling system 7 in the second region 5 of the transducer housing 1 and in the exemplary embodiment shown in FIG. 1, the system has a weakly coupled mechanical resonator 8, but in the exemplary embodiments as shown in FIGS. 2 and 3, preferably, it has two weakly coupled mechanical resonators 8.

What is achieved in the ultrasonic transducers in accordance with the invention, to the extent they have been described so far, especially by the weakly coupled mechanical resonator 8 or by the two weakly coupled mechanical resonators 8, is explained above. Otherwise, reference is made in this respect also to the German patent disclosure 10 2008 033 098 and corresponding European patent disclosure 2 148 322, from which ultrasonic transducers are known with the features which have been explained so far. Consequently, again the disclosure contents of the above identified disclosures are referenced relative to this aspect of the ultrasonic transducer in accordance with the invention.

Compared to the ultrasonic transducers known in the prior art, the ultrasonic transducers in accordance with the invention are improved with reference to the prevention of the transmission of housing waves.

As the figures show, in addition to the coupling system 7, there is a second soft mechanical coupling system 9. This second coupling system 9 is implemented essentially according to the first coupling system 7. In the two coupling systems 7, 9 the mechanical resonator 8 or the mechanical resonators 8 are active in the propagation direction of the housing waves essentially in succession; the resonators therefore act serially.

According to another teaching of the invention which acquires special importance, when there is a second coupling system 9 in addition to the first coupling system 7, the two coupling systems 7, 9 are made and arranged such that they are active in parallel.

In the ultrasonic transducer which underlies the invention and in the ultrasonic transducer in accordance with the invention as is shown in FIG. 1, the transducer element 2 is on the lower end of the transducer housing 1, i.e., on the end which is facing the flowing medium or also projects into the flowing medium. The first mechanical coupling system 7 is implemented on the upper end of the transducer housing 1, so to speak is part of the transducer housing 1. The known ultrasonic transducer and the ultrasonic transducer in accordance with the invention, to the extent it has been described so far, can also be described such that it is made in three parts, specifically has a lower first region 3 which holds the transducer element 2, a relaying second region 5 and an upper third region 6 to which the first coupling system 7 belongs. The relaying second region 5 can be specifically a housing tube 10, and the upper end of the transducer housing 1 can be made as a housing flange 11. The lower first region 3 of the transducer housing 1, the relaying second region 5 of the transducer housing 1 made as a housing tube 10, the first coupling system 7 and the housing flange 11 are therefore located in series.

In all the exemplary embodiments of the ultrasonic transducers in accordance with the invention which are shown in the figures, another teaching of the invention which acquires special importance is implemented. Accordingly, the ultrasonic transducer in accordance with the invention in addition is characterized in that, of the two coupling systems 7, 9, the first coupling system 7 is located on the side of the housing flange 11 near the transducer element 2 and the second coupling system 9 is located on the side of the housing flange 11 away from the transducer element 2. This is implemented in particular in the illustrated embodiments such that the coupling system 7 which is located on the side of the housing flange 11 near the transducer element 2 is connected to the housing tube 2 on its end near the transducer element 2 and is connected to the housing flange 11 on its end away from the transducer element 2, and that the second coupling system provided on the side of the housing flange 11 away from the transducer element 2 is connected to the housing tube 10 on its end away from the transducer element 2 and to the housing flange 11 on its end near the transducer element 2. Therefore, the two coupling systems 7, 9 are active anti-parallel. Housing waves emerging from the transducer element 2, on the one hand, in the first coupling system 7 near the transducer element 2, and on the one hand, in the second coupling system 9 away from the transducer element 2, have a partially, preferably completely compensating action with respect to the housing flange 11 of the transducer housing.

The above described connectedness of the coupling systems 7, 9 to the housing tube 10 and the housing flange 11 can be implemented differently. In the described exemplary embodiments the end of the first coupling system 7 near the transducer element 2, which end is near the transducer element 2, and the end of the second coupling system 9 away from the transducer element 2, which end is away from the transducer element 2, are welded to the housing tube 10. Here, the end of the first coupling system 7 near the transducer element 2, which end is away from the transducer element 2, and the end of the second coupling system 9 away from the transducer element 2, which end is near the transducer element 2, are made integral with the housing flange 11.

In the ultrasonic transducer in accordance with the invention which is shown in FIG. 1, the transducer element 2 is located on the end of the transducer housing 1 facing the medium whose flow rate is to be measured.

As already stated, in ultrasonic transducers, the transducer elements are often piezoelements which cannot be used above a certain temperature, i.e., the Curie point. Consequently, in the prior art, there are also ultrasonic transducers in which the transducer elements are away from the ultrasound window of the transducer housing (see in this respect German patent 198 12 458 and European patent 1 046 886 of the same content). FIGS. 2 and 3 show exemplary embodiments of ultrasonic transducers in accordance with the invention in which the transducer elements 2 are located away from the ultrasound window 4 of the transducer housing 1, therefore away from the medium whose flow rate is to be measured.

Otherwise, FIGS. 2 and 3 show preferred embodiments of ultrasonic transducers in accordance with the invention inasmuch as the coupling systems 7, 9 are each provided with a groove 12 which runs around the outside, therefore so to speak an elastic hinge is implemented between the mechanical resonators 8. Here, the grooves 12 are made arc-shaped in the groove base or are provided with arc-shaped transitions to the groove flanks, as a result of which mechanical overstresses are avoided.

FIG. 3 shows one especially preferred exemplary embodiment of an ultrasonic transducer in accordance with the invention. In this ultrasonic transducer, as is known from German patent 198 12 458 and European patent 1 046 886 of the same content, the transducer element 2 is on the end away from the ultrasound window 4 of the transducer housing 1. There is an ultrasound waveguide 15 which is surrounded by a protective tube 16 between the transducer element 2 and the ultrasound window 4. The damping material 13 which is provided within the transducer housing 1 is intended to damp only housing waves, of course not to adversely affect the transmission properties of the ultrasound waveguide.

The damping material 13 which is provided within the transducer housing in the exemplary embodiment as shown in FIG. 3, is preferably bronze granulate or bronze powder, acts especially well when and only when it is under a certain pressure within the transducer housing 1. To achieve this pressure, in the exemplary embodiment as shown in FIG. 3, there is a pressure generating apparatus 17 which acts on the damping material 13 on the end of the transducer housing 1 away from the ultrasound window 4, which in the exemplary embodiment is supported on one side on the transducer housing 1 and which has a spring 18 which acts on the damping material 13 on the other side, in the illustrated exemplary embodiment a cup spring assembly.

What is claimed is:

1. An ultrasonic transducer for use in an ultrasonic flow meter, comprising:
   a transducer housing having an ultrasound window and a housing tube,
   a transducer element for sending or receiving ultrasonic waves located in the transducer housing,
   a first relatively weak mechanical coupling system having at least one weakly coupled mechanical resonator or two weakly coupled mechanical resonators, and
   a second weak mechanical coupling system.

2. The ultrasonic transducer in accordance with claim 1, wherein said first relatively weak mechanical coupling system and said second weak mechanically coupling system are essentially the same.

3. The ultrasonic transducer in accordance with claim 2, wherein the two coupling systems are active in parallel.

4. The ultrasonic transducer in accordance with claim 3, wherein the transducer housing has a housing tube and a housing flange, wherein a first of the two coupling systems located on a side of the housing flange facing the ultrasound window and a second of the two coupling systems is located on a side of the housing flange facing away from the ultrasound window.

5. The ultrasonic transducer in accordance with claim 4, wherein the first coupling system is connected to the housing tube on an end facing toward the ultrasound window and is connected to the housing flange on an end that faces away from the ultrasound window, and wherein the second coupling system is connected to the housing tube on an end facing away from the ultrasound window and to the housing flange on an end facing toward the ultrasound window.

6. The ultrasonic transducer as claimed in claim 5, wherein the end of the first coupling system which is near the ultrasound window and the end of the second coupling system which is away from the ultrasound window are welded to the housing tube.

7. The ultrasonic transducer in accordance with claim 5, wherein the end of the first coupling system which faces away from the ultrasound window and the end of the second coupling system is faces toward the ultrasound window are integral with the housing flange.

8. The ultrasonic transducer in accordance with claim 1, wherein the at least one coupling systems is provided with a circumferentially running groove that forms an elastic hinge between the first and second weakly coupled mechanical resonators.

9. The ultrasonic transducer in accordance with claim 8, wherein the groove has one of an arc-shaped groove base and arc-shaped transitions from the groove base to flanks of the groove.

10. Ultrasonic transducer for use in an ultrasonic flow meter, comprising:
a transducer housing having an ultrasound window in a first region,
a transducer element for sending or receiving ultrasonic waves and located close to the ultrasound window of the transducer housing or far from the ultrasound window of the transducer housing,
wherein ultrasonic waves are transmitted as housing waves between the first region of the transducer housing via a relaying second region of the transducer housing into a third region of the transducer housing which is opposite the first region of the transducer housing,
a relatively weak mechanical coupling system provided in the second region of the transducer housing and having at least two weakly coupled mechanical resonators,
wherein a damping material is provided with the transducer housing.

11. The ultrasonic transducer in accordance with claim 10, wherein the transducer housing has an insulating disc on an end near the ultrasound window, the insulating disc preventing penetration of the damping material into the ultrasound window.

12. The ultrasonic transducer in accordance with claim 10, wherein the transducer element is on the end of the transducer housing away from the ultrasound window, wherein an ultrasound waveguide is provided between the transducer element and the ultrasound window, and wherein a protective tube is provided surrounding the ultrasound waveguide.

13. The ultrasonic transducer in accordance with claim 10, wherein a pressure generating apparatus which acts on the damping material is provided on the end of the transducer housing away from the ultrasound window.

14. The ultrasonic transducer in accordance with claim 13, wherein the pressure generating apparatus is supported on one side on the transducer housing and has a spring which acts on the damping material provided on another side of the transducer housing.

15. The ultrasonic transducer in accordance with claim 14, wherein said spring is a cup spring assembly.

16. The ultrasonic transducer in accordance with claim 10, wherein the damping material is bronze granulate or bronze powder.

* * * * *